United States Patent
Wang et al.

(10) Patent No.: US 11,516,191 B2
(45) Date of Patent: Nov. 29, 2022

(54) METHOD OF AND SYSTEM FOR SECURE DATA EXPORT FROM AN AUTOMOTIVE ENGINE CONTROL UNIT

(71) Applicant: Continental Teves AG & Co . oHG, Frankfurt am Main (DE)

(72) Inventors: Wen Wang, Frankfurt am Main (DE); Marc Sebastian Patric Stöttinger, Frankfurt am Main (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 41 days.

(21) Appl. No.: 17/245,442

(22) Filed: Apr. 30, 2021

(65) Prior Publication Data

US 2021/0367930 A1 Nov. 25, 2021

(30) Foreign Application Priority Data

May 19, 2020 (EP) .................................... 20175487

(51) Int. Cl.
*H04L 29/06* (2006.01)
*H04L 9/40* (2022.01)
*H04L 9/08* (2006.01)
*H04L 9/32* (2006.01)

(52) U.S. Cl.
CPC ........ *H04L 63/0435* (2013.01); *H04L 9/0869* (2013.01); *H04L 9/3242* (2013.01); *H04L 9/3247* (2013.01); *H04L 9/3268* (2013.01); *H04L 9/3271* (2013.01); *H04L 2209/84* (2013.01)

(58) Field of Classification Search
CPC . H04L 63/0435; H04L 9/0869; H04L 9/3242; H04L 9/3268; H04L 9/3247; H04L 9/3271; H04L 2209/84
See application file for complete search history.

(56) References Cited

U.S. PATENT DOCUMENTS 8,831,224 B2 9/2014 Bai et al.
10,286,051 B1 5/2019 Alfred et al.
(Continued)

OTHER PUBLICATIONS

Q. Pan and J. Tan, "A Dynamic Key Generation Scheme Based on CAN Bus," 2019 10th International Conference on Information Technology in Medicine and Education (ITME), 2019, pp. 564-569, doi: 10.1109/ITME.2019.00133. (Year: 2019).*
(Continued)

*Primary Examiner* — Shawnchoy Rahman
(74) *Attorney, Agent, or Firm* — RatnerPrestia

(57) ABSTRACT

A method of secure data export from an automotive ECU to a requesting entity includes receiving a signed request, the request transmitting a first public encryption key. The signature is verified using a second public key stored in the automotive ECU. Further, the requesting entity is authenticated. Only upon successful verification and authentication the automotive ECU generates a random symmetric key for encrypting the data to be exported. The symmetric key is encrypted using the first public key received in the request, and unencrypted data is deleted. The encrypted data is exported to the requesting entity, which decrypts the symmetric key using a first private key associated with the first public key, and decrypts the data encrypted with the symmetric key.

14 Claims, 3 Drawing Sheets

(56) References Cited

U.S. PATENT DOCUMENTS

| | | | |
|---|---|---|---|
| 11,177,953 B2* | 11/2021 | Zeh | H04L 63/0823 |
| 2008/0120504 A1* | 5/2008 | Kirkup | H04L 9/003 |
| | | | 713/176 |
| 2011/0138179 A1* | 6/2011 | Jiang | H04L 63/045 |
| | | | 713/168 |
| 2015/0052352 A1 | 2/2015 | Dolev et al. | |
| 2015/0180840 A1 | 6/2015 | Jung et al. | |
| 2016/0171802 A1 | 6/2016 | Fountain | |
| 2017/0134164 A1 | 5/2017 | Haga et al. | |
| 2018/0212987 A1 | 7/2018 | Chen et al. | |
| 2018/0234843 A1 | 8/2018 | Smyth et al. | |
| 2019/0020633 A1 | 1/2019 | Leavy et al. | |
| 2019/0306136 A1 | 10/2019 | David et al. | |
| 2020/0159930 A1* | 5/2020 | Venkateswaran | H04W 4/38 |
| 2020/0313909 A1* | 10/2020 | Mondello | H04L 9/3242 |
| 2021/0328782 A1* | 10/2021 | David | H04L 9/0866 |

OTHER PUBLICATIONS

Mansor, H., et at, "Log Your Car: Reliable Maintenance Services Record," Mar. 3, 2017, Pervasive: International Conference on Pervasive Computing; [Lecture Notes in Computer Science]; Springer, Berlin, Heidelberg, pp. 484-504, XP047406485, ISBN: 978-3-642-17318-9, [retrieved on Mar. 3, 2017].

Mansor, H., et al., "Don't Brick Your Car Firmware Confidentiality and Rollback for Vehicles," 2015 10th International Conference on Availability, Reliability and Security, IEEE, Aug. 24, 2015, pp. 139-148, XP032795237, DOI: 10.1109/ARES.2015.58 [retrieved on Oct. 16, 2015].

Mansour, K., et al., "AiroDiag: A Sophisticated Tool that Diagnoses and Updates Vehicles Software Over Air," Electric Vehicle Conference (IEVC). 2012 IEEE International, IEEE, Mar. 4, 2012, pp. 1-7, XP032166570, DOI: 10.1109/IEVC.2012,6183181. ISBN: 978-1-4673-1562-3.

Bayer, S., et al., "OBD = Open Barn Door? Security Vuinerabilities and Protections for Vehicular OBD Interfaces," 10. IAV Symposium f?r Steuerungssysteme, Nov. 11, 2014, 16 pages, XP055258960, Berlin, Germany, Retrieved from the Internet: https://www.escrypt.com/fileadmin/escrypt/pdf/Whitepaper/OBD_Open_Barn_Door_Security_Vulnerabilities_and_Protections_for_Vehicular_On_Board_Diagnosis.pdf [retrieved on Mar. 16, 2016].

Extended European Search Report for European Application No. 20 175 487.6, dated Jul. 28, 2020, 10 pages.

* cited by examiner

METHOD OF AND SYSTEM FOR SECURE DATA EXPORT FROM AN AUTOMOTIVE ENGINE CONTROL UNIT

CROSS REFERENCE TO RELATED APPLICATIONS

This application claims priority to European Patent Application No. 20175487, filed May 19, 2020, the contents of such application being incorporated by reference herein.

FIELD OF THE INVENTION

The present invention relates to methods of exporting data from automotive engine control units (ECUs) to requesting entities, more particularly to methods of secure data export using authentication and encryption, and to a system and its constituents implementing such method.

BACKGROUND OF THE INVENTION

Engine control units of modern vehicles comprise a large amount of configuration data and data collected during operation, in addition to the software or firmware that implements a number of functions on these ECUs.

Read or write access to such ECUs is generally limited, inter alia for protecting intellectual property, for preventing tampering with the software or its parametrization, which could lead to the operation of a vehicle outside legal limits, and for securing data that might be useful or necessary as evidence in an investigation after a malfunction or accident.

Many ECUs that store sensitive configuration settings or sensitive data use a secure diagnosis access protocol to prevent unauthorized access. Usually, the access control involves a challenge-response protocol for authentication, in which one party presents a question, i.e., the "challenge", and another party must provide a valid answer, i.e., a "response", to be authenticated and granted access. The simplest example of a challenge-response protocol is password authentication, where the challenge is asking for the password and the valid response is the correct password.

Clearly an adversary who can eavesdrop on a password authentication can then authenticate itself in the same way. One solution is to issue multiple passwords, each of them marked with an identifier. The verifier can ask for any of the passwords, providing the identifier, and the prover must have that correct password for that identifier. Assuming that the passwords are chosen independently, an adversary who intercepts one challenge-response message pair has no clues to help with a different challenge at a different time.

Some more advanced protocols employ signature-based authorization schemes for access control. Other schemes, like e.g., Autosar's Secure Onboard Communication (SecOC), employ authentication schemes in addition to signature-based authorization.

However, some issues with the application of SecOC to mass-produced products remain. Challenging topics are, inter alia, the key management and the recovery strategy. The recovery strategy for instance is how to deal with failed authentications, how to ensure the functionality or at least the safety of the system in such a case, and how to recover the system operation when participants are out of synchronization.

All of these measures are mainly implemented for ensuring tamper resistance and authenticity of log data that is used for documenting functional errors or events indicating occurrence of an attack.

In particular, critical log data of some ECUs, which may be used in forensic analysis after a malfunction or an attack, need not only be securely stored in the ECUs. Rather, any export of the data for analysis must be made in a way that prevents any modification of the exported data during transport. End-to-end security is of particular importance in case the data is routed or forwarded over multiple communication devices. One example in which the log data needs to be secured for forensic proposes is an airbag ECU. The log data generated in the event of deploying the airbag must be securely stored and safely kept in the ECU for later forensic proposes, and it must not be possible to modify the data during export. One possibility to prevent tampering with the data during export is encrypting the data for storage and/or transport.

However, current state-of-the art solutions in the automotive domain for such sensitive or critical data suffer from multiple issues. Due to limitations in the processing power of ECUs the cryptography algorithms currently used for access control via signature-based verification may not be long-term secure. Storing a symmetric secret key for encryption and authentication of the sensitive or critical log data on the ECU may render the encryption useless, if an attacker manages to obtain access to the storage memory of the device and to locate and read the key. Once the attacker has obtained the key it is possible to decrypt and manipulate the sensitive forensic log data.

In addition, each ECU needs to use a unique key for encrypting and authenticating the critical or sensitive data in order to prevent reuse of leaked keys from "hacked" ECUs of the same series. This security concept implies that a large amount of non-volatile memory is provided in each ECU that is reserved for a longer period of time, and also creates a significant administrative overhead on the backend-side, where the forensic analysis is performed.

Last but not least a general authenticated encryption scheme to export the log data securely does not provide forward secrecy. Thus, if a key is leaked, an attacker can decrypt and/or manipulate the log data unless the keys are manually updated in the ECU and the backend.

SUMMARY OF THE INVENTION

An aspect of the present invention is an improved method for securely exporting data from automotive ECUs. Another aspect of the present method is an ECU and a backend device, or requesting entity, at implementing cooperating parts of the method, a vehicle comprising an ECU in accordance with an aspect of the invention, as well as a system comprising at least one vehicle and at least one backend device, or requesting entity, both in accordance with an aspect of the invention.

A method of secure data export from an automotive ECU to a requesting entity in accordance with a first aspect of the invention comprises, at the automotive ECU, receiving a data export request from the requesting entity. The data export request includes a first public key of a first public/private key pair. The first public key is signed with a second private key of a second public/private key pair. The data export request further includes a certificate indicating an expiry date or a time period of validity of the first public key.

The data export request may be generally compliant with Unified Diagnostic Services (UDS), which is a diagnostic communication protocol in the ECU-environment within the automotive electronics, specified in the ISO 14229-1 standard, or with other protocols used for communication access to automotive ECUs. The first public key and/or the certificate may be received in a payload section of the request. In case the payload section of the protocol used is too small, the first public key and/or the certificate may be received in one or more subsequent transmissions.

The method further comprises verifying the signature of the received first public key, using a copy of the second public key of the second public/private key pair that had previously been stored in a memory of the automotive ECU, e.g., during manufacturing thereof.

The method yet further comprises authenticating the requesting entity. Authenticating may include executing method steps of a challenge-response protocol, e.g., sending an authentication request and receiving a corresponding response. Verifying of the signature of the received first public key and authenticating the requesting entity, e.g., executing the challenge-response protocol, may also be executed in reversed order.

If any one of authentication and verification are not successful, the communication session may immediately be terminated.

Only if both, authentication and verification, are successful, the method further includes, at the automotive ECU, generating a random symmetric key, and reading data to be exported in accordance with the request from a first storage space of the automotive ECU's memory into a volatile memory of the automotive ECU, e.g., RAM or registers of a microprocessor.

The expression "symmetric key" in this description refers to a key for symmetric encryption, i.e., an encryption that can be decrypted using the very same key that was used for encryption. Contrary to that, a public/private key pair is used for asymmetric encryption, in which a message that was encrypted using a public key can only be decrypted using the associated private key. The private key may also be used for signing a message, and the authenticity of the signature may be verified using the associated public key.

In case the request is received in a UDS message, the request's service ID (SID) may include SID "0x22—Read Data By Identifier", "0x23—Read Memory By Address" or "0x19—Read DTC Information". It is to be noted that the request may also be transmitted in accordance with a different protocol or format. In any case, the data is generally read as specified in the request, unless higher priority restrictions prevent reading some or all of the data.

The first storage space may include storage space in a non-volatile memory of the ECU, e.g., secure memory space reserved for storing sensitive and/or critical data, but may also include registers or addresses in the microprocessor or the RAM. Secure memory spaces may be provided for storing log data and other data that may be used in forensic analyses after a failure of the ECU has occurred, or after a security- or safety-relevant event has been triggered by the ECU. Such safety-relevant event may include, e.g., deploying an airbag. Again, these two method steps, generating the key and reading the data, may be carried out in reversed order.

In further steps of the method the data read into the volatile memory of the automotive ECU is encrypted using the symmetric key previously generated, and a message authentication code (MAC) is generated, also using the symmetric key. The encrypted data and the MAC are stored in the volatile memory of the automotive ECU. The message authentication code and the encrypted data may be generated in a single step, using authenticated encryption. However, encrypted data and message authentication code may also be generated in separate steps. Authenticated encryption (AE) and authenticated encryption with associated data (AEAD) are forms of encryption which simultaneously assure the confidentiality and authenticity of data.

In next steps of the method, the symmetric key is encrypted using the first public key received in the request, and the encrypted symmetric key, the encrypted data and the message authentication code are combined into an export data set. Once the export data set is created, the first public key, the unencrypted data, the message authentication code and the symmetric key are deleted from the volatile memory of the automotive ECU.

Next, the export data set is transmitted, or read access to the memory space storing the export data set is granted, to the requesting entity. After the data has been exported the export data set is deleted from the volatile memory of the automotive ECU.

In one or more embodiments of the method the steps for secure data export are executed in a first operating mode of the automotive ECU that inhibits or blocks interfering or intermediate read access at least to those storage spaces of the volatile or non-volatile memory that permanently or temporarily store keys or data used in the present request. The first operating mode may be entered upon receiving the request or upon authenticating the requesting entity. Read access in the first operating mode may be inhibited at least for any requesting entity that is not identical to the authenticated requesting entity. The first operating mode may persist while the original request by the authenticated requesting entity has not been fully served and the export data set has not been deleted.

In embodiments of the method the step of deleting the export data set, after transmitting, comprises deleting the original data collected or generated in the ECU, including corresponding data that may be stored in secure memory spaces. This embodiment ensures that the data, once transmitted, can only be deciphered or decrypted by an owner of the first private key of the first public/private key pair that was transmitted in the request. Since the data is deleted from the ECU after transmission, a subsequent request will not result in a transmission of an identical data set.

In embodiments of the method the automotive ECU stores a plurality of second public keys of corresponding second public/private key pairs. Each of the second public keys may be used by a requesting entity, i.e., an apparatus that actually issues the data export request to the automotive ECU. Each of the different second public key pairs may be used to request secure data export in accordance with the present method, and each second public key may authorise data export of different permitted sets of export data. Permitted sets of export data may be stored in the automotive ECU, along with the associated second public keys. The level of authorisation for data export of a requesting entity may thus be identified by the signature that is verified upon receiving the request. While the request itself may try to read data not comprised in the permitted set of data for the specific second public key that was used for authentication of the request's signature, the export data set prepared by the automotive ECU will comprise only data from an intersecting set of the data identified in the request and the permitted data set associated with the second public key. Alternatively, such request may be rejected as a whole. Different levels of authorisation, or different permitted sets of export data may, for example, be provided for authorities and for manufacturers of automotive ECUs or vehicles equipped with the automotive ECUs. These embodiments allow for each of the owners of an authorized second public/private key pair to read permitted data sets under the corresponding individual keys or key-pairs, respectively. In addition or alternatively to limiting the export data set to permitted data sets for specific requesting entities, the second public key used for successfully verifying an actual secure data export request may be stored in the automotive ECU, preferably in the secure memory area, for documenting purposes, e.g., for being able to prove a read access by a specific requesting entity or by an owner of such specific requesting entities.

An automotive ECU in accordance with a second aspect of the invention comprises a microprocessor, volatile and non-volatile memory, one or more communication interfaces, and a symmetric key generator. The non-volatile memory may comprise a secure memory area, which may be implemented either as a dedicated memory address range of a common non-volatile memory, or as a physically separate memory device, e.g., a memory chip separate from other non-volatile memory provided in the automotive ECU. The non-volatile memory of the automotive ECU may further comprise a memory storing at least one second public key. This memory may be implemented in the general non-volatile memory provided in the automotive ECU, or in the secure memory area. The symmetric key generator may be implemented as a dedicated hardware device or in software. The non-volatile memory stores computer program instructions which, when executed by the microprocessor, cause the automotive ECU to execute a method in accordance with embodiments of the first aspect of the invention.

In accordance with a third aspect of the invention, a method of requesting and receiving a secure data export, from an automotive ECU and in accordance with the method of the first aspect of the invention, comprises, at the requesting entity, generating a first public/private key pair. The first private/public key set is generated only in the immediate context of an impending request, and is destroyed or deleted after the request has been completed, i.e., a response has been received, or after a predetermined lifetime of the first private/public key set has expired.

The method further comprises signing the first public/private key pair previously generated with a private key of a second public/private key pair, the public key of the second public/private key pair having previously been stored in a memory of the automotive ECU.

The requesting entity may be identified by the second public key of the second public/private key pair. This implies that the physical implementation or representation of the requesting entity may vary, and that different physical entities may present themselves as the same requesting entity by using the same second public key. This also implies that an owner of a second public/private key pair will be responsible for securing and controlling distribution and access to the second public/private key pair.

The method yet further comprises transmitting a data export request targeting the automotive ECU, the data export request including the signed first public key and a certificate indicating an expiry date or a time period of validity of the first public key.

The method further comprises, after the data export request has been transmitted, providing authentication to the automotive ECU, in response to a corresponding request received from, or a protocol initiated by, the automotive ECU.

The method further comprises, after successful authentication, receiving an export data set, or receiving a read access grant, to a memory space of the automotive ECU storing the export data set, and reading the export data set accordingly, wherein the export data set includes a symmetric key encrypted with the first public key of the first public/private key pair, data encrypted with the symmetric key, and a message authentication code generated using the symmetric key.

The symmetric key received in the export data set is then decrypted using the first private key of the first public/private key pair, and the data is decrypted, and its authenticity is verified, using the decrypted symmetric key. Also, the certificate is analysed for identifying if the first public key is still valid, i.e., the lifetime has not yet expired. If the lifetime of the first public key of the request, as set out in the certificate, has expired prior to the time of receiving the export data set, the received export data set may be discarded. Checking the expiry of the first public key may occur prior to decrypting the symmetric key.

A requesting entity in accordance with the third aspect of the invention comprises a microprocessor, a volatile memory, a non-volatile memory, one or more communication interfaces, and a key storage and/or key generator configured to store and/or generate public/private key pairs. The non-volatile memory stores computer program instructions which, when executed by the microprocessor, cause the requesting entity to execute a method in accordance with the third aspect of the invention. The non-volatile memory may comprise a dedicated memory space for securely storing data received from an automotive ECU in response to a data export request.

In one or more embodiments of the method in accordance with the third aspect the request is transmitted, from the requesting entity to the automotive ECU, via a diagnostic device. The diagnostic device may be any intermediary device that establishes communication between the requesting entity and the automotive ECU, preferably through encrypted communication connections. The diagnostic device may provide authentication via an encrypted pass-through of the authentication received from the requesting entity, or in place of the requesting entity. In the latter case, the communication connections between the requesting entity and the diagnostic device and between the diagnostic device and the automotive ECU may be protected separately, e.g., by individual and separate encryption or authentication. Accordingly, access or authentication, respectively, from the requesting entity to the diagnostic device, may be governed separate from access of the diagnostic device to the automotive ECU, prior to relaying the data export request to the automotive ECU. It goes without saying that the diagnostic device may also perform protocol translation between the requesting entity and the automotive ECU, both physically and logically. In these embodiments the method further comprises, at the diagnostic device, receiving the data export request targeting the automotive ECU. The diagnostic device relays the data export request to the automotive ECU, and provides authentication to the automotive ECU. The diagnostic device receives the export data set, or receives the read access grant to a memory space of the automotive ECU storing export data set, and reads the export data set accordingly. The diagnostic device further relays the received or read export data set to the requesting entity, for decryption and authentication. It is to be noted that the diagnostic can only access the encrypted data. If an attacker having access to the diagnostic device manipulates any data of the request, and relays the modified request to the automotive ECU, the validation performed in the automotive ECU will not be successful, and the request will be discarded by the automotive ECU.

The diagnostic device may establish a real-time connection between the requesting entity and the automotive ECU, acting as a gateway, or may sequentially establish connections with the requesting entity and the automotive ECU, respectively. In the latter case, the diagnostic device provides a buffer memory for intermediately storing the request and the export data set prior to relaying.

According to a fourth aspect, a diagnostic device adapted to execute steps of the method in accordance with the third aspect of the invention comprises a microprocessor, a volatile memory, a non-volatile memory, and one or more communication interfaces, for communicating with an automotive ECU and a requesting entity. The volatile memory may comprise a dedicated memory space configured for securely buffering data received from the automotive ECU or the requesting entity prior to transmitting or relaying the received data to the requesting entity or the automotive ECU, respectively. The dedicated memory space may be protected so as to inhibit any read or write access that is not in accordance with receiving and transmitting or relaying data in accordance with a data export request issued by a requesting entity. The non-volatile memory stores computer program instructions which, when executed by the microprocessor, cause the diagnostic device to execute steps of the method in accordance with the third aspect of the invention. In particular, the computer program instructions configure the diagnostic device to create, maintain, clear, and/or control access to, the dedicated memory space in relation to a data export request issued by and received from a requesting entity.

An aspect of the present invention also relates to a vehicle comprising an automotive ECU adapted or configured to execute a method in accordance with the first aspect of the present invention.

The present method and apparatuses for secure data export use public key encryption schemes and a specific access and read protocol to avoid having to permanently store encryption keys on the automotive ECU. Transmitting encryption keys with the request and generating ephemeral encryption keys in the automotive ECU facilitates secure data read out in devices deployed in large numbers, because it is not necessary to provide an individual key to each of the devices, which may be difficult to handle at the requesting entities' side. In fact, a device-specific key management and long-term secure key storage at the requesting side is not required at all.

Generating one-time keys, or keys having a short lifetime, to be used exclusively for the request and the response, and deleting the source data after transmission, effectively prevents so-called replay attacks, in which a key is re-used in subsequent attempts to access an automotive ECU.

Having to permanently store only one or a small number of public keys of authorised requesting entities in the automotive ECUs reduces the memory required in each automotive ECU while still enabling high security data export. As only the public key of the second public/private key pair needs to be stored in the automotive ECU, only this key pair needs to be generated using a long-term secure key generation scheme. Since these schemes typically require a larger effort for generating key pairs, the overall requirements are reduced.

While the method has been presented hereinbefore with a focus on automotive ECUs it may be used in any kind of embedded device that needs a mechanism to securely export data to a requesting entity.

BRIEF DESCRIPTION OF THE DRAWINGS

In the following section, exemplary embodiments of the invention will be described with reference to the attached drawing. In the drawing

DETAILED DESCRIPTION OF THE PREFERRED EMBODIMENTS

Figure 1:
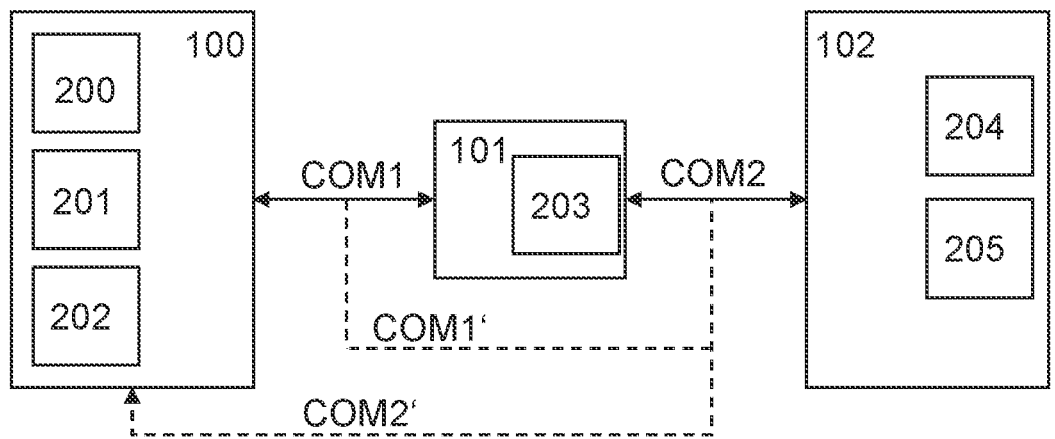
FIG. 1 shows an exemplary and simplified schematic block diagram of a system 10 whose components are adapted to execute methods in accordance with an aspect of the present invention.

In the figures, identical or similar elements are referenced using the same reference numerals.

FIG. 1 shows an exemplary and simplified schematic block diagram of a system 10 whose components are adapted to execute methods in accordance with one or more aspects of the present invention. The system 10 comprises an automotive ECU 100, a diagnostic device 101 and a requesting entity 102. The automotive ECU 100 and the diagnostic device 101 each include a first communication interface and are connected via a first bi-directional communication connection COM1, indicated by a double-pointed arrow. The diagnostic device 101 and the requesting entity 102 each include a second communication interface and are connected via a bi-directional communication connection, again indicated by a double-pointed arrow. The first and the second communication interfaces may be of the same type or of different types, physically and/or logically. The requesting entity 102 may represent what can also be referred to as a "backend device", i.e., a device that may be separate or even remote from the diagnostic device 101 and merely uses it to connect to the automotive ECU 100. This may be advantageous in that the requesting entity 102 may have access rights to memory areas in the automotive ECU 100 that are not available to the diagnostic device 101. The diagnostic device 101 may simply serve as a kind of gateway between the automotive ECU 100 and the requesting entity 102.

Alternatively, the automotive ECU 100 and the requesting entity 102 may be configured to directly communicate, indicated by the dashed double-pointed arrows COM1' and COM2'. In case a direct communication between the automotive ECU 100 and the requesting entity 102 is established via communication connection COM1', the communication interfaces between requesting entity 102 and diagnostic device 101 are of the same type as the communication interfaces used for the communication connection between diagnostic device 101 and automotive ECU 100. In case a direct connection between the automotive ECU 100 and the requesting entity 102 is established via communication connection COM2', the communication interfaces between requesting entity 102 and automotive ECU 100 may be of a different type than the communication interfaces used for the communication connection between diagnostic device 101 and automotive ECU 100.

The exemplary automotive ECU 100 comprises, in addition to the first communication interface, a secure memory area 200, provided, inter alia, for storing safety critical data and parameters, log data, in particular log data pertaining to documenting device failures or safety-relevant events, and the like, collected and/or recorded during manufacturing and/or operation of the automotive ECU 100. The automotive ECU 100 further comprises a memory area 201, provided for permanently storing at least one second public key of a requesting entity, for verifying a signature of a data export request. IN embodiments, the memory area 201 may permanently store multiple second public keys, allowing for verifying signatures of different requesting entities 102. The memory area 201 may also temporarily store a first public key received in the data export request. The automotive ECU 100 further comprises a symmetric key generator 202, for generating one-time symmetric key pairs used in a response to a data export request.

The diagnostic device 101 comprises, in addition to the first and the second communication interface, a dedicated memory buffer space 203, for securely buffering data received from the automotive ECU or the requesting entity prior to transmitting or relaying the received data to the requesting entity or the automotive ECU, respectively.

The requesting entity 102 comprises, in addition to the second communication interface, a storage space 204 for permanently and securely storing second public/private key pairs, and a generator for generating first public/private key pairs, which may temporarily be stored in storage space 204. The storage space 204 may be internal memory of a physical device or a database that is communicatively connected to the requesting entity 102. The requesting entity 102 further comprises a memory space 205 for securely storing data received from an automotive ECU in response to a data export request. Like the storage space 204, the storage space 205 may be internal memory of a physical device or a database that is communicatively connected to the requesting entity 102, and is preferably non-volatile.

Figure 2:
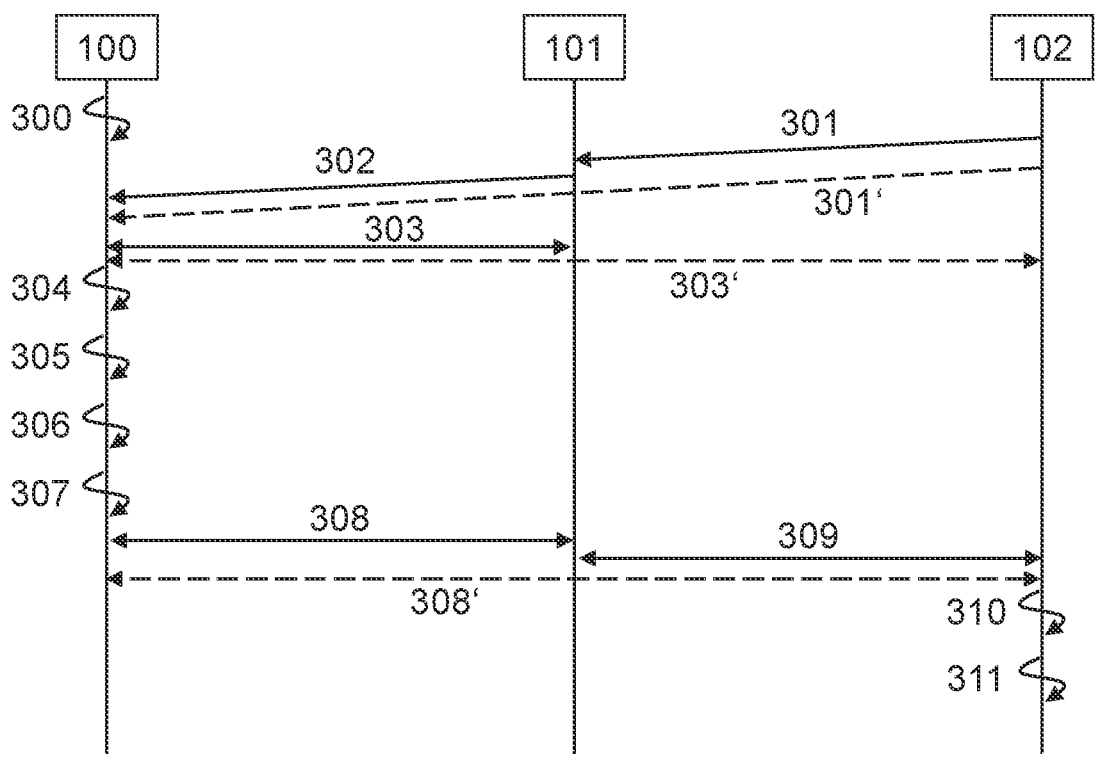
FIG. 2 shows an exemplary message flow and process step diagram of a method in accordance with an aspect of the present invention, between an automotive ECU 100, a diagnostic device 101, and a requesting entity 102.

FIG. 2 shows an exemplary message flow and process step diagram of a method in accordance with an aspect of the present invention, between an automotive ECU 100, a diagnostic device 101, and a requesting entity 102.

Prior to any communication, it is assumed, in step 300, that automotive ECU 100 has collected data and stored the data in a memory.

Before any data export request can be issued by requesting entity 102, the second private/public key pair for the signature generation is generated (not shown), preferably using a long-term secure asymmetric signature scheme, e.g., XMMS, Sphincs, or Dilithium. The second public/private key pair may be generated by requesting entity 102, or generated externally and permanently stored in requesting entity 102. Permanent storage in the context of this disclosure is not necessarily meant to be totally indelible. Rather, it is of a non-volatile nature. The public key of the second public/private key pair is retrievably stored in the automotive ECU 100. Likewise, before any data export request can be issued by requesting entity 102, the first private/public key pair for to be sent in the data export request is generated (not shown). The first private/public key pair may be generated by requesting entity 102, or may be generated by an external entity and provided to requesting entity 102. The first public/private key pair may be generated using a code-based or lattice-based post-quantum key scheme. As the first key has a significantly shorter lifetime, and re-using thereof after a successful data export is not possible, the key pair need not be long-term secure, and can be generated with lower effort than the second public/private key pair. The first public key and a certificate are now signed using the second private key. The certificate holds, inter alia, a time stamp indicating a point in time until which it is valid. The limited temporal validity may be used to avoid replay attacks.

In step 301 the requesting entity 102 transmits the data export request to the diagnostic device 101. In step 302 the diagnostic device 101 relays data export request to the automotive ECU 100. Alternatively, in step 301' and indicated by the dashed arrow, the requesting entity 102 transmits the data export request directly to the automotive ECU 100.

The data packages transmitted in steps 301 and 302 or, alternatively, in step 301', contain the data export request itself, in accordance with a protocol used by the diagnostic device 101 and/or the automotive ECU 100, and the signed first public key and certificate. In case the communication between the requesting entity 102 and the automotive ECU 100 is routed via the diagnostic device 101, data received is buffered in the diagnostic device 101 prior to relaying. Depending on the duration of the buffering in diagnostic device 101, the time before the certificate expires, i.e., is no longer valid, must be selected accordingly.

In step 303 the automotive ECU authenticates the diagnostic device 101. A further authentication between the requesting entity 102 and the diagnostic device 101, which may also be performed, is not shown in the figure. Authentication may be performed in accordance with the communication protocol used. In case of a communication through automotive CAN, authentication may be part of the UDS diagnostic access and may include a challenge-response scheme. If the requesting entity 102 communicates directly with the automotive ECU 100, authentication is likewise performed directly, step 303', indicated by the dashed double-pointed arrow.

After successful authentication, e.g., after a successfully completed challenge-response procedure, in step 304 the signed certificate and first public key received in the request are verified by the automotive ECU 100, using the stored second public key. Verification of the signature using the corresponding public key serves for validating the authenticity or origin of the first public key and the certificate received in the request. Also, in step 304 the temporal validity of the certificate is checked, i.e., it is checked if the request is still valid at checking time.

Upon positive verification and validation of the request the automotive ECU 100 generates, in step 305, a random symmetric key that is used, inter alia, for encrypting the data to be exported to the requesting entity in response to the request, as well as for generating an authenticity token, e.g., a message authentication code (MAC), for ensuring the authenticity of the encrypted data. Symmetric key encryption may be less demanding in terms of computational power and is, therefore, particularly suitable for encrypting larger amounts of data in automotive ECUs, which automotive ECUs may have limited processing resources. The symmetric key may, for example, have a length that would be considered insecure for long-term use. However, since the key is randomly generated and can only be used for one single transmission, this does not represent a significant security problem. In addition, the symmetric key is encrypted, prior to transmitting to the requesting entity, using the first public key received in the request. The asymmetric encryption scheme used may provide greater security than the symmetric encryption. Encrypting only small amounts of data, e.g., the symmetric key and a message authentication code, using a more complex and computationally challenging algorithm, is possible even on an automotive ECU having limited processing resources.

The data to be exported, after encryption using the symmetric key, and the authenticity token are stored, in the automotive ECU, in step 306. Thereafter, in step 307, the symmetric key is encapsulated, using the first public key and a long-term secure encapsulation algorithm. The encapsulated symmetric key is stored in a secure container, along with the encrypted data to be exported, and the authentication token, and an export data set is put together. Only now the symmetric key, the first public key and the data encrypted using the symmetric key, which may be referred to as "raw" data, is deleted from the memory of automotive ECU 100. All data to be exported is now found only in the secure container or in the export data set, respectively.

Once the export data set is ready for transmission, in step 308 the export data set is transmitted, from the automotive ECU 100 to the diagnostic device 101 or, in alternative step 308', directly to the requesting entity 102. Transmission may be "active", i.e., the automotive ECU 100 sends a message including the data of the export data set, or "passive". In a "passive" transmission, read access to addresses in a memory space temporarily storing the export data set is granted to the diagnostic device 101 or the requesting entity 102. Use of active or passive transmission depends on the protocol used. As read access may be exploited for reading any address in the memory, such read access is only granted after authentication, verification, and after the "raw", unencrypted data has been safely deleted from all addresses of the memory that can be read by an external device. If the data is first transmitted to the diagnostic device 101, it will be buffered therein and forwarded, in step 309, to the requesting entity 102.

Once all of the data exported from automotive ECU 100 is present in requesting entity 102 the encapsulated symmetric key is decrypted, in step 310, using the first private key that belongs to the first public key and that is stored in the requesting entity 102. In this context the validity of the first public key may also be checked, i.e., if the lifetime of the first public key as set out in the certificate has expired.

In step 311 the symmetric key is used to decrypt the data received from the automotive ECU 100. The authenticity token is used, in the decryption step, to verify the authenticity of the decrypted data. Any manipulation of the encrypted data during transportation will result in a failed authentication. The exported data can now be processed and/or stored or distributed in the requesting entity.

The method may be used, for example, for securely exporting data for forensic analysis, e.g., after an airbag of a vehicle has deployed and investigations are required. The various method steps at the automotive ECU, the diagnostic device and the requesting entity will be presented in the following:

In accordance with the method, the airbag control unit, or airbag ECU, stores a second public key issued by an authorized requesting entity in a non-volatile memory. The requesting entity stores a second private key that belongs to the second public key. Together, the second public key and the second private key form a second public/private key pair.

When the airbag was deployed, the airbag ECU had stored corresponding log data in a secure memory space, which needs to be retrieved for forensic analysis. An investigator connects a testing device, capable of providing a secure diagnostic access to the airbag ECU via OBDII, to the requesting entity, e.g., via a network connection. First the investigator needs to authenticate himself and/or the secure diagnostic device to the requesting entity, e.g., via a secure connection, like TLS or the like. After successful authentication of the investigator and/or the secure diagnostic device, and after checking the privileges of the investigator, a first, ephemeral private-public key pair for a key encapsulation mechanism is generated in the requesting entity. Further, a certificate for the first key pair is generated, indicating a maximum time of validity. The first public key and the certificate are added to a datagram and are signed using the second private key. The signed datagram is then transmitted, from the requesting entity, to the secure diagnostic device of the investigator. The requesting entity may also provide the required commands or other data for executing the data extraction from the airbag ECU to the secure diagnostic device.

After the secure diagnostic device received the datagram from the requesting entity, the investigator can physically connect the diagnostic device to the vehicle via the OBD-II port and start the data extraction session. First, the diagnostic device requests secure diagnostic access, and the airbag ECU initiates a challenge-response scheme to authenticate the diagnostic device. If the challenge-response procedure fails, the airbag ECU will terminate the session. If the challenge-response procedure is successful, the diagnostic device is informed accordingly, and the diagnostic device may send a datagram, e.g., the signed datagram from the requesting entity. The airbag ECU receives the datagram and verifies the certificate and the signature, using the stored second public key. If the verification of the signature is not successful, or if the time of validity of the certificate has expired, the airbag ECU will terminate the session. If the verification of the signature is successful and the time of validity of the certificate has not expired, the airbag ECU generates a random, secret symmetric key and uses it for authenticated encryption of the log data. The so-generated ciphertext and authenticity token are temporarily stored on the airbag ECU's internal memory. The airbag ECU then encapsulates the symmetric key in a secure container using the first public key. The container is temporarily stored in the airbag ECU, and the plain-text symmetric key, the first public key and the plain-text log data are deleted from the memory of the airbag ECU. Only then the diagnostic device can access the memory, and the diagnostic session can be executed in a conventional manner. The diagnostic device reads the encrypted data from the airbag ECU and buffers it in its memory. The data is then transferred to the requesting entity, e.g., via a network connection or on a mobile storage unit, e.g., a USB thumb drive. The requesting entity receives the data and decapsulates the symmetric key. The symmetric key can now be used to decrypt the log data, and to verify the authenticity thereof. The first public/private key pair and the associated certificate may now be deleted in the requesting entity, and the log data may be stored securely in the requesting entity, or a database connected thereto, for later analysis.

In another example, the method is used for securely exporting data for forensic analysis, e.g., for detecting a potential manipulation or attack of a vehicle's control unit. In the following example the vehicle's control unit is a navigation system, or navigation ECU. The various method steps at the automotive ECU, the diagnostic device and the requesting entity will be presented in the following:

Like in the previous example, in accordance with the method, the navigation ECU stores a second public key issued by an authorized requesting entity in a non-volatile memory. The requesting entity stores a second private key that belongs to the second public key. Together, the second public key and the second private key form a second public/private key pair.

For the investigation of the navigation ECU, which will be performed on a separate computer system, the relevant secret and/or sensitive data of the navigation ECU needs to be transmitted in an authentic and confidential manner to the separate computer system, i.e., the requesting entity. In this example, the requesting entity is capable of direct communication with the navigation ECU. Thus, in accordance with the inventive method, first an ephemeral first public/private key pair for key encapsulation is generated by the requesting entity. Also, a certificate for the first public/private key pair is generated, indicating a maximum time of validity. The first public key and the certificate are added to a datagram and are signed using the second private key. The signed datagram is then transmitted, from the requesting entity to the navigation ECU, in accordance with a diagnostic protocol. To this end, the investigator establishes a remote communication connection between the requesting entity and the navigation ECU, and requests secure diagnostic access. The navigation ECU a challenge response scheme to authenticate the requesting entity. If the challenge-response procedure fails, the navigation ECU will terminate the session. If the challenge-response procedure is successful, the requesting entity is informed accordingly and may send a datagram, e.g., the signed datagram containing the first public key and the certificate. The datagram may also include one or more memory addresses whose content shall be exported. The memory addresses may store, e.g., log data and other data.

The navigation ECU receives the datagram and verifies the certificate and the signature, using the stored second public key. If the verification of the signature is not successful, or if the time of validity of the certificate has expired, the navigation ECU will terminate the session. If the verification of the signature is successful and the time of validity of the certificate has not expired, the navigation ECU generates a random, secret symmetric key and uses it for authenticated encryption of the log data. The so-generated ciphertext and authenticity token are temporarily stored on the airbag ECU's internal memory. The navigation ECU encapsulates the symmetric key in a secure container using the first public key. The container is temporarily stored in the navigation ECU, and the plain-text symmetric key, the first public key and the plain-text log data are deleted from the memory of the navigation ECU. Only then the requesting entity can access the memory of the navigation ECU, and the diagnostic session can be executed in a conventional manner. The requesting entity reads the encrypted data from the navigation ECU and stores it in its memory. The requesting entity can now decapsulate the symmetric key, and use the symmetric key to decrypt the exported data, and to verify the authenticity thereof. The first public/private key pair and the associated certificate may now be deleted in the requesting entity, and the log data may be stored securely in the requesting entity, or a database connected thereto, for later analysis.

Figure 3:
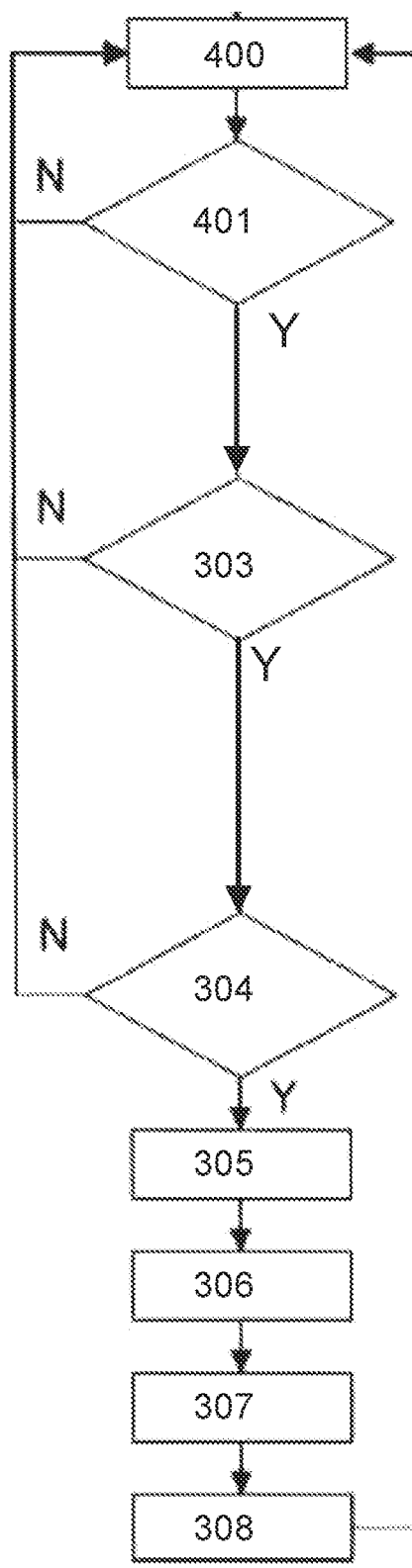
FIG. 3 shows an exemplary flow chart of the inventive method executed in the automotive ECU 100.

FIG. 3 shows an exemplary flow chart of the inventive method executed in the automotive ECU 100. Step 400 merely depicts an idle state of the communication interface, waiting for receiving a diagnostic access request. In step 410, the automotive ECU checks if such diagnostic access request is received. If no such request is received, "N"-branch of step 401, the method returns to the idle state 400. If a diagnostic access request is received, "Y"-branch of step 401, the automotive ECU performs an authentication of the requesting entity in step 303. If the authentication fails, "N"-branch of step 303, the automotive ECU returns to the idle state 400. In case of a successful authentication, "Y"-branch of step 303, the automotive ECU verifies the authenticity of the received request in step 304, e.g., by checking the signature. If the verification fails, "N"-branch of step 304, the automotive ECU returns to the idle state 400. In case of a successful verification, "Y"-branch of step 304, the automotive ECU generates a random symmetric key, step 305, and uses it, in step 306, for encrypting the data identified in the request, and for generating an authenticity token. In step 307 the automotive ECU encapsulates the symmetric key, using the first public key received in the request, prepares the secure container, or export data set, and deletes the unencrypted or unencapsulated data. Only thereafter the automotive ECU transmits, in step 308, the encrypted data and encapsulated symmetric key to the requesting entity. It goes without saying that the requesting entity may be the original requesting entity or any intermediary, e.g., a diagnostic device. The security is fully maintained in the automotive ECU, irrespective of the device that communicates with the automotive ECU.

Figure 4:
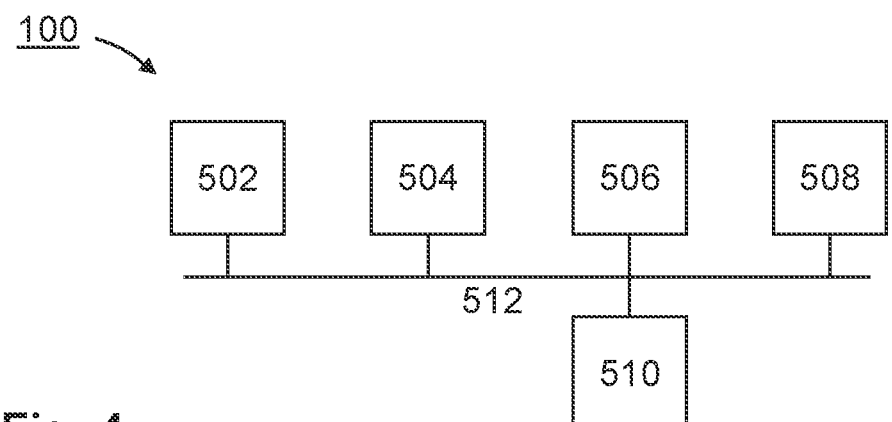
FIG. 4 shows an exemplary block diagram of an automotive ECU 100 adapted to execute the method according to the first aspect of the invention.

FIG. 4 shows an exemplary block diagram of an automotive ECU 100 adapted to execute the method according to the first aspect of the invention. A microprocessor 502, volatile and non-volatile memory 504, 506, one or more communication interfaces 508, and a symmetric key generator 510 are communicatively connected via one or more data connections or buses 512. Non-volatile memory 406 stores computer program instructions which, when executed by microprocessor 502, configure the automotive ECU 100 to execute method steps of the method according to the first aspect of the invention.

Figure 5:
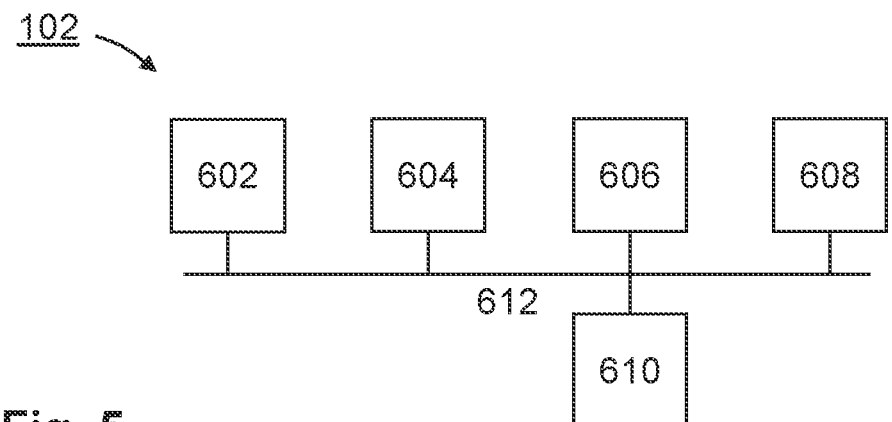
FIG. 5 shows an exemplary block diagram of a requesting entity 102 adapted to execute steps of the method according to the third aspect of the invention.

FIG. 5 shows an exemplary block diagram of a requesting entity 102 adapted to execute steps of the method according to the third aspect of the invention. A microprocessor 602, volatile and non-volatile memory 604, 606, one or more communication interfaces 608, and a public/private key storage or public/private key generator 610 are communicatively connected via one or more data connections or buses 612. Non-volatile memory 606 stores computer program instructions which, when executed by microprocessor 602, configure the requesting entity 102 to execute method steps of the method according to the third aspect of the invention.

Figure 6:
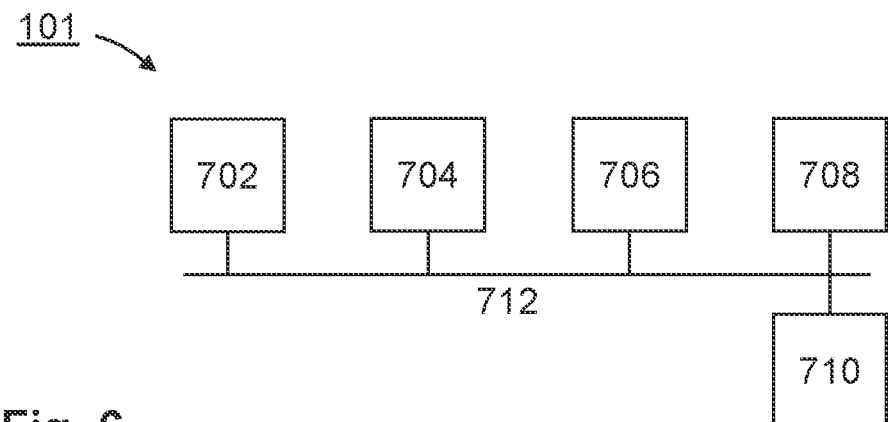
FIG. 6 shows an exemplary block diagram of a diagnostic device 101 adapted to execute steps of the method according to the third aspect of the invention.

FIG. 6 shows an exemplary block diagram of a diagnostic device 101 adapted to execute steps of the method according to the third aspect of the invention. A microprocessor 702, volatile and non-volatile memory 704, 706, one or more communication interfaces 708, 714, and a public/private key storage or public/private key generator 710 are communicatively connected via one or more data connections or buses 712. Non-volatile memory 706 stores computer program instructions which, when executed by microprocessor 702, configure the diagnostic device 101 to execute method steps of the method according to the first aspect of the invention.

| LIST OF REFERENCE NUMERALS | |
|---|---|
| 10 | system |
| 100 | automotive ECU |
| 101 | diagnostic device |
| 102 | requesting entity |
| 200 | (secure) memory area |

-continued

LIST OF REFERENCE NUMERALS

| | |
|---|---|
| 201 | memory storing at least one second public key |
| 202 | symmetric key generator |
| 203 | buffer memory |
| 204 | memory storing first public/private key pair |
| 205 | memory storing export data set |
| COM1 | first communication connection |
| COM1' | alternative first direct communication connection |
| COM2 | second communication connection |
| COM2' | alternative second direct communication connection |
| 300 | collect and store data |
| 301, 301' | transmit data export request |
| 302 | forward data export request |
| 303, 303' | authentication |
| 304 | verification |
| 305 | generate random symmetric key |
| 306 | symmetric encryption, generation of authenticity token |
| 307 | encapsulating symmetric key, preparing of export data set, deleting raw data |
| 308, 308' | transmit/read data |
| 309 | forward data |
| 310 | decrypt symmetric key |
| 311 | decrypt exported data |
| 400 | idle |
| 401 | diagnostic access request received? |
| 502 | microprocessor |
| 504 | volatile memory |
| 506 | non-volatile memory |
| 508 | communication interface |
| 510 | symmetric key generator |
| 512 | data connection/bus |
| 602 | microprocessor |
| 604 | volatile memory |
| 606 | non-volatile memory |
| 608 | communication interface |
| 610 | symmetric key generator |
| 612 | data connection/bus |
| 702 | microprocessor |
| 704 | volatile memory |
| 706 | non-volatile memory |
| 708, 710 | communication interface |

The invention claimed is:

1. A method of secure data export from an automotive ECU to a requesting entity, comprising, at the automotive ECU:
receiving a data export request from the requesting entity, the data export request including a first public key of a first public/private key pair, wherein the first public key is signed with a second private key of a second public/private key pair, the data export request further including a certificate indicating an expiry date or a time period of validity of the first public key,
verifying the signature of the received first public key using a copy of the second public key of the second public/private key pair that is stored in a memory of the automotive ECU,
authenticating the requesting entity,
the method further comprising, if the authentication and the verification are successful:
generating a random symmetric key,
reading data to be exported in accordance with the request from a first storage space of the automotive ECU's memory into a volatile memory of the automotive ECU,
encrypting the data read into the volatile memory of the automotive ECU using the symmetric key, generating a message authentication code using the symmetric key, storing the encrypted data and the message authentication code in the volatile memory of the automotive ECU,
encrypting the symmetric key using the first public key,
combining the encrypted symmetric key, the encrypted data and the message authentication code into an export data set,
deleting the first public key, the unencrypted data, the message authentication code and the symmetric key from the volatile memory of the automotive ECU,
transmitting the export data set, or grant read access to the memory space storing export data set, to the requesting entity, and
deleting the export data set from the volatile memory of the automotive ECU.

2. The method of claim 1, wherein the first storage space is a secure memory space of the automotive ECU, and wherein the data export request is targeted to obtain log data stored in the secure memory space of the automotive ECU.

3. The method of claim 1, wherein the step of authenticating precedes the step of verifying.

4. The method of claim 1, wherein the step of authenticating includes executing a challenge-response procedure.

5. The method of claim 1, wherein the automotive ECU inhibits or blocks any interfering request while the received data export request has not been served and the export data set has not been deleted.

6. The method of claim 1, further comprising deleting the data that was exported, from the first storage space of the automotive ECU's memory, after the export data set has been transmitted.

7. The method of claim 1, further comprising:
verifying the signature of the received first public key against copies of a plurality of second public keys of a corresponding plurality of second public/private key pairs that are stored in the memory of the automotive ECU, and
read data to be exported in accordance with the request and with a permitted set of data predetermined for the verified signature, from a first storage space of the automotive ECU's memory into a volatile memory of the automotive ECU, and/or
storing log data indicating the verified signature used in a successful export data request in a memory of the automotive ECU, in particular in a secure memory space of the automotive ECU.

8. An automotive ECU including a microprocessor, a volatile memory, a non-volatile memory, at least one communication interface, and a symmetric key generator, which are communicatively connected via at least one data connection or bus, wherein the non-volatile memory stores computer program instructions which, when executed by the microprocessor, cause the automotive ECU to execute a method in accordance with claim 1.

9. A method of requesting and receiving a secure data export from an automotive ECU executing a method in accordance with claim 1, comprising, at the requesting entity:
generating a first public/private key pair,
signing the first public key of the first public/private key pair with a private key of a second public/private key pair, the public key of the second public/private key pair having previously been stored in a memory of the automotive ECU, transmitting a data export request targeting the automotive ECU, the data export request including the signed first public key and a certificate indicating an expiry date or a time period of validity of the first public key, providing authentication to the automotive ECU, in response to a corresponding request received from, or a protocol initiated by, the automotive ECU, receiving an export data set, or receiving a read access grant, to a memory space of the automotive ECU storing the export data set, and reading the export data set accordingly, wherein the export data set includes a symmetric key encrypted with the first public key of the first public/private key pair, data encrypted with the symmetric key, and a message authentication code generated using the symmetric key, checking the certificate, if the expiry date or the time of validity, of the first public key, is exceeded and, if the first public key is still valid:

decrypting the symmetric key using the first private key of the first public/private key pair, and decrypt the data and verify the authenticity of the data using the decrypted symmetric key.

10. A requesting entity comprising, communicatively connected via at least one data connection or bus: a microprocessor, a random volatile memory, a non-volatile memory, one or more communication interfaces, and a key storage and/or a key generator adapted to store and/or generate public/private key pairs, wherein the non-volatile memory stores computer program instructions which, when executed by the microprocessor, cause the requesting entity to execute a method in accordance with claim 9.

11. The method of claim 9, wherein the request is transmitted, from the requesting entity to the automotive ECU, via a diagnostic device, and wherein the method further comprises, at the diagnostic device:

receiving, from the requesting entity, the data export request targeting the automotive ECU, transmitting the data export request to the automotive ECU, providing authentication to the automotive ECU, receiving the export data set, or receiving the read access grant to a memory space of the automotive ECU storing export data set and reading the export data set accordingly, and forwarding the export data set to the requesting entity.

12. The method of claim 11, further comprising, at the diagnostic device:

providing authentication between the requesting entity and the diagnostic device prior to transmitting the received data export request to the automotive ECU.

13. A diagnostic device for automotive ECUs comprising, communicatively connected via at least one data connection or bus:

a microprocessor, volatile and non-volatile memory, a first interface configured to communicate with a requesting entity-comprising, communicatively connected via at least one data connection or bus:

a microprocessor;

a random volatile memory;

a non-volatile memory;

one or more communication interfaces; and a key storage and/or a key generator adapted to store and/or generate public/private key pairs, wherein the non-volatile memory stores computer program instructions which, when executed by the microprocessor, cause the requesting entity to execute a method comprising, at the requesting entity:

generating a first public/private key pair, signing the first public key of the first public/private key pair with a private key of a second public/private key pair, the public key of the second public/private key pair having previously been stored in a memory of the automotive ECU, transmitting a data export request targeting the automotive ECU, the data export request including the signed first public key and a certificate indicating an expiry date or a time period of validity of the first public key, providing authentication to the automotive ECU, in response to a corresponding request received from, or a protocol initiated by, the automotive ECU, receiving an export data set, or receiving a read access grant, to a memory space of the automotive ECU storing the export data set, and reading the export data set accordingly, wherein the export data set includes a symmetric key encrypted with the first public key of the first public/private key pair, data encrypted with the symmetric key, and a message authentication code generated using the symmetric key, checking the certificate, if the expiry date or the time of validity, of the first public key, is exceeded and, if the first public key is still valid:

decrypting the symmetric key using the first private key of the first public/private key pair, and decrypting the data and verify the authenticity of the data using the decrypted symmetric key, and a second interface configured to communicate with an automotive ECU in accordance with claim 8, wherein the non-volatile memory stores program instructions which, when executed by the microprocessor, cause the diagnostic device to execute a method comprising:

receiving, from the requesting entity, the data export request targeting the automotive ECU;

transmitting the data export request to the automotive ECU;

providing authentication to the automotive ECU;

receiving the export data set, or receiving the read access grant to a memory space of the automotive ECU storing export data set and reading the export data set accordingly; and forwarding the export data set to the requesting entity.

14. A vehicle comprising an automotive ECU executing a method in accordance with claim 1.

* * * * *